United States Patent Office 3,535,285
Patented Oct. 20, 1970

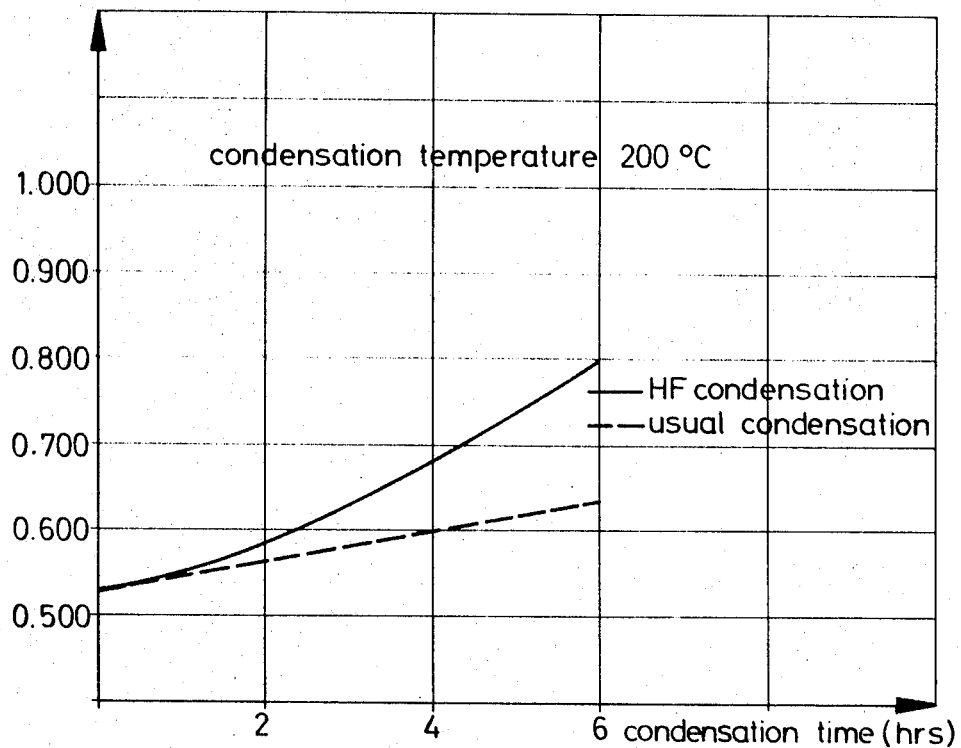

3,535,285
AFTER-CONDENSATION OF POLYCONDENSATION POLYMERS IN AN ELECTRICAL HIGH FREQUENCY FIELD
Robert Breiner, Bobingen, and Hans Thaler, Strabberg, Germany, assignors to Farbwerke Hoechst Aktiengesellschaft vormals Meister Lucius & Bruning, Frankfurt am Main, Germany, a corporation of Germany
Filed Feb. 14, 1968, Ser. No. 705,455
Claims priority, application Germany, Feb. 28, 1967, 51,666
Int. Cl. C08g *17/00, 20/38*
U.S. Cl. 260—75      7 Claims

ABSTRACT OF THE DISCLOSURE

The invention provides a method for after-condensing polycondensation products in the solid state under reduced pressure or while passing over an inert gas at a temperature of from 10 to 100° C. below the crystallite melting point of the products under the action of an electrical high frequency field.

---

The present invention relates to a process for after-condensing polycondensation products in the solid state under the action of an electrical high frequency field.

Polycondensation products having very high molecular weights are characterized by some properties owing to which they constitute very valuable starting materials for the manufacture of industrial products. They have high strengths and are extremely resistant to mechanical stress.

Numerous processes have been proposed to transform normal polycondensation products, especially of polyesters and polyamides, into products having a very high viscosity and a very high molecular weight. The most obvious method consists in continuing the polycondensation in the molten state beyond the usual period of time until the desired high molecular weight is reached, while mechanically mixing and passing through or over the melt a current of a dry inert gas, or the pressure is reduced to remove the gaseous reaction products. In this process, however, undesired side reactions often occur which involve yellowing of the polycondensation products and thus impair their quality.

It has also been proposed to increase the molecular weight by adding solvents which form under the reaction conditions an azeotrope with the reaction products separated during polycondensation, which azeotrope can then be distilled off. This process is, however, quite uneconomical. Moreover, products are obtained which are contaminated by traces of retained solvent and thus have a poorer quality.

Still further, it has been proposed to condense $\epsilon$-aminocarboxylic acids in the molten state by passing over nitrogen in an electrical high frequency field and thus to produce polyamides of high molecular weight. This process has not been practised, however, because it is very difficult to carry out the condensation in the melt on an industrial scale with the aid of an electrical high frequency field. Inter alia, difficult sealing and stirring problems arise and the material used for the construction of the reactor must be absolutely inert towards the melt.

For some years past attempts have been made to increase the molecular weight of polycondensation products beyond the normal values by an after-condensation in the solid phase and certain successes have been achieved with polyamides and also with polyesters. Processes in which the polycondensation products are maintained at elevated temperature for a prolonged period of time have some advantages, but in practice troubles do occur very often because the particles of the polycondensation products heated to a temperature near the melting point adhere to the heated walls of the reaction vessel and agglomerate with one another. Moreover, analyses of after-condensed polyethylene terephthalate have revealed that owing to the supply of heat from the outside different degrees of polycondensation develop in the polymer particles used. On the surfaces of the particles high molecular weights are formed whereas the interior is only little modified so that a broad molecular weight distribution is obtained.

It has now been found that the aforesaid disadvantages can be avoided and polycondensation products having a low moisture degree can be after-condensed in the solid state at a temperature below their crystallite melting point under reduced pressure or while passing over an inert gas when the said polycondensation products are subjected for at least 30 minutes to the action of an electrical high frequency field at a temperature of from 10 to 100° C. below their crystallite melting point.

As polycondensation products capable of being after-condensed by the process of the invention there are mentioned, by way of example, linear polyesters such as polyethylene terephthalate, copolyesters, linear polyamides, for example those of $\epsilon$-aminocaproic acid, hexamethylene diamine and adipic acid as well as mixed polyamides including those containing aromatic diamines or aromatic dicarboxylic acids as structural units, and mixed polycondensation products, for example polyester amides, polyether amides, and polyether esters. The polycondensation products must have a high degree of dryness, i.e. prior to the after-condensation in the electrical high frequency field they should have only a very low internal water content, for example, of at most 0.01% by weight for polyethylene terephthalate and at most 0.1% by weight for polycaprolactam, determined by the method of K. Fischer. A water content slightly exceeding the aforesaid limits may be removed under the action of the high frequency field when the product is in the reaction vessel. When the products have a substantially higher inner water content they undergo hydrolytic decomposition under the conditions of the after-condensation. Suitable materials for the reaction vessel are especially substances having very low dielectric losses, for example glass, ceramics or polytetrafluoroethylene. The shape of the reaction vessel is suitably adapted to the shape of the electrodes between which the high frequency field is generated. If possible, the field strength should be equal at each point inside of the reaction vessel. It is advantageous to use a reaction vessel having a square or rectangular cross section in which plate-shaped electrodes lie close on opposite walls.

The polycondensation products used may have various shapes, they may be used, for example in the form of powder or granules. It is particularly advantageous to use the polycondensation products in the form of finished goods, for example filaments, fibers, films or injection molded articles. The polycondensation products to be subjected to the after-condensation according to the invention should have a specific viscosity of at least about 0.3.

The reaction products formed during the after-condensation in the electrical high frequency field are removed with special advantage under a reduced pressure below 10 mm. of mercury. When an inert gas is used to remove the volatile reaction products, it proved especially advantageous to use a gas current the temperature of which is the same as that of the product to be after-condensed. When the electrical high frequency field is switched on, the polycondensation products warm up so that a supply of heat from the outside is not necessary. The highly frequent electrical field must be regulated so that the temperature of the polycondensation product is maintained in the range of from 10 to 100°

C., preferably 10 to 70° C., below the crystallite melting point, that is to say the melting point of the crystalline portion of the polycondensation product. The after-condensation of polyethylene terephthalate, for example, having a crystallite melting point of 264° C., should therefore be carried out at a temperature in the range of from 164 to 254° C., preferably 194 to 254° C.

The required range of temperature can advantageously be reached by an electrical high frequency field having a strength of from 0.2 to 6 kilovolt/cm. and a frequency of from 2 to 60 megacycles. It is especially favorable when the electrical high frequency field has a strength between 1 and 1.5 kilovolt/cm. and a frequency between 5 and 25 megacycles.

The time of action of the high frequency field on the polycondensation product to be after-condensed should be at least 30 minutes, periods of up to about 12 hours being normal. The upper limit is at about 20 hours.

The process according to the invention presents the following advantages: the heat required for the after-condensation is generated uniformly inside the material to be condensed, whereby a very narrow molecular weight distribution is obtained. The molecular weight distribution can be further narrowed when the inert gas passed over the material has the same temperature as the material to be after-condensed. By this step the material is prevented from cooling on the surface so that the after-condensation takes place on the surface as rapidly as inside of the particles of the polycondensation product. The products thus obtained having a particularly uniform degree of polycondensation are distinguished by a very high strength. The after-condensation in the electrical high frequency field is more rapid and economical than a known after-condensation by mere heating for a prolonged period of time. The accompanying graph shows the increase of the molecular weight of a polyethylene terephthalate having a specific viscosity of 0.52 with an increasing condensation time in the course of a conventional heat treatment at 200° C. (broken line) and during a high frequency condensation according to the invention at the same temperature (unbroken line). As measure for the molecular weight the specific viscosity determined with a 1% by weight solution of the polyethylene terephthalate in a mixture of phenol/tetrachloroethan (3:2) at 25° C. is plotted on the ordinate.

In the course of the conventional heat treatment at 200° C. the molecular weight appears to approach a limiting value with increasing condensation time, whereas during the course of the high frequency condensation this value approximately increases exponentially.

A further special advantage of the process according to the invention resides in the fact that it is also suitable to be carried out in continuous manner. The dimensions of the reaction vessel and the amount put through are then chosen in such a manner that the average residence time corresponds to the desired increase in the molecular weight.

The products which have been after-condensed by the process of the invention do not show any change in color by the high frequency treatment. Many of them are soluble in solvent mixtures, for example phenol/tetrachloroethane at elevated temperature only. To characterize the products it is, therefore, often expedient to determine the melt viscosity in a capillary viscosimeter or to determine the solution viscosity and the melt viscosity.

Owing to their high strengths the products which have been after-condensed by the process according to the invention can be used in many fields of application, for example as machine elements or cog wheels. In textile industries after-condensed polyamides and polyesters are mainly used for making yarns of high tenacity which are suitable in all fields of application in which high demands are made on the tensile strength, abrasion resistance and flexural strength. They are used for the manufacture of cord for aeroplane and automobile tyres which are subject to high stress, for the manufacture of filter cloth, conveyor belts, cone belts, safety belts, ropes for alpinists and tow ropes, and have well proved their value in all fields of application.

The following examples serve to illustrate the invention but they are not intended to limit it thereto.

EXAMPLE 1

About 500 grams of polyethylene terephthalate granules (4 x 5 x 2 mm.) having a specific viscosity of 0.80 (determined at 25° C. in phenol/tetrachloroethane (3:2) with a concentration of 1 gram for 100 milliliters), a water content of about $4 \cdot 10^{-3}\%$ by weight (determined according to the method of K. Fischer) and a melt viscosity of 2500 poises at 285° C. (determined in a capillary viscometer of Messrs. DAM, Lyon, France) were filled into a glass tube closed with two stoppers and having a diameter of 80 millimeters so that about one-half of the tube was uniformly filled. The tube was placed into a highly frequent electrical field (Siemens high frequency alternator, 16 megacycles, electrode area 60 x 40 cm.).

The electrode distance was adjusted to 90 mm. and the field strength was adjusted to 1 kilovolt/cm. After 15 to 20 minutes a temperature of about 200° C. was reached. To measure the temperature a thermoelement was installed inside the material and for each measurement the field was disconnected for a short period of time. The granules were maintained at said temperatures for 6 hours, possible variations in temperature being corrected by changing the electrode distance, while dried pure nitrogen was passed through at a rate of 1 liter per minute. A pure white product was obtained having a specific viscosity of 1.2 and a melt viscosity of 9000 poises at 285° C.

EXAMPLE 2

Polyethylene terephthalate having a specific viscosity of 0.52, determined as defined in Example 1, was treated for 6 hours under the conditions specified in Example 1. The final product obtained had a specific viscosity of 0.8 and a melt viscosity of 1900 poises at 285° C.

EXAMPLE 3

The reaction vessel described in Example 1 was filled with about 500 grams of polycaprolactam in the form of granules (1.5 x 1.5 x 2 mm.) having a water content of 0.07% by weight determined according to K. Fischer, a relative viscosity of 2.28, determined at 20° C. in an Oswald viscosimeter in $H_2SO_4$ of 95.5% strength by weight with a solution of 1 gram of polymer in 100 milliliters of solution, and a melt viscosity of 1200 poises at 285° C., in a manner such that approximately one-half of the cross section of the tube was filled with the product to be treated. With an average electrode distance of 130 millimeters the granules were maintained for 5 hours at 190° C., while dried pure nitrogen was passed over. The product obtained had a relative viscosity of 2.75 and a melt viscosity of 2655 poises at 285° C.

What is claimed is:
1. A process for after condensing solid linear polycondensation products in the solid state which comprises subjecting a solid linear polycondensation product having a low internal moisture content selected from the group consisting of polyesters, polyamides, polyester amides, polyether amides and polyether esters, said condensation product to be after-condensed having a specific viscosity determined at 25° C. in a mixture of 3 parts phenol and 2 parts of tetrachloroethane at a concentration of 1 gram per 100 milliliters of at least about 0.3, for at least 30 minutes to an electrical high frequency field at a temperature of from 10 to 100° C. below the crystallite melting point of said polycondensation product, while said polycondensation product is under reduced pressure or while an inert gas is being passed over said polycondensation product.

2. A process according to claim 1 wherein the temperature is 10 to 70° C. below the crystallite melting point and the electrical high frequency field has a strength between 1 and 1.5 kilovolt/cm. and a frequency between 5 and 25 megacycles.

3. The process of claim 1, wherein the polycondensation products are subjected to the action of the high frequency field in the form of finished goods.

4. The process of claim 1, wherein the polycondensation products are subjected to the action of the high frequency field under a reduced pressure below 10 mm. of mercury.

5. The process of claim 1, wherein the inert gas passed over the polycondensation product has the same temperature as the said product.

6. The process of claim 1, wherein the high frequency field has an intensity of 0.2 to 5 kilovolt/cm. and a frequency of 2 to 6 megacycles.

7. The process of claim 1, wherein the electrical field has an intensity of 1 to 1.5 kilovolt/cm. and a frequency of 5 to 25 megacycles.

References Cited

UNITED STATES PATENTS

| | | | |
|---|---|---|---|
| 2,585,970 | 2/1952 | Shaw | 99—221 |
| 2,640,142 | 5/1953 | Kinn | 219—47 |
| 2,738,406 | 3/1956 | Zaleski | 219—10.55 |
| 3,342,782 | 9/1967 | Barkey | 260—75 |
| 3,232,810 | 2/1966 | Reesen | 156—273 |

FOREIGN PATENTS

| | | |
|---|---|---|
| 627,596 | 11/1961 | Italy. |
| 614,625 | 12/1948 | Great Britain. |

OTHER REFERENCES

Duryee, Electr. World 124(9), 84–87 (1945).

Raff et al., Mod Plast. 44(2), 130 (1966). (Chem. Abstr. supplied.)

Encycl. Polym. Sci. Technol. 5, 2–8 (1966).

Cable, Induction & Dielectric Heating, Reinhold, New York, 1954, pp. 404–05.

Hartshorn, Radio Frequency Heating, Allen & Unwin, London, 1949, pp. 182–87.

WILLIAM SHORT, Primary Examiner

M. GOLDSTEIN, Assistant Examiner

U.S. Cl. X.R.

260—78, 96